US011895479B2

(12) United States Patent
Bin et al.

(10) Patent No.: US 11,895,479 B2
(45) Date of Patent: Feb. 6, 2024

(54) STEERING OF BINAURALIZATION OF AUDIO

(71) Applicant: Dolby Laboratories Licensing Corporation, San Francisco, CA (US)

(72) Inventors: Qingyuan Bin, Beijing (CN); Libin Luo, Beijing (CN); Ziyu Yang, Beijing (CN); Zhiwei Shuang, Beijing (CN); Xuemei Yu, Beijing (CN); Guiping Wang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 152 days.

(21) Appl. No.: 17/637,446

(22) PCT Filed: Aug. 19, 2020

(86) PCT No.: PCT/US2020/047079
§ 371 (c)(1),
(2) Date: Feb. 22, 2022

(87) PCT Pub. No.: WO2021/034983
PCT Pub. Date: Feb. 25, 2021

(65) Prior Publication Data

US 2022/0279300 A1 Sep. 1, 2022

Related U.S. Application Data

(60) Provisional application No. 62/956,424, filed on Jan. 2, 2020, provisional application No. 62/896,321, filed on Sep. 5, 2019.

(30) Foreign Application Priority Data

Aug. 19, 2019 (WO) ................ PCT/CN2019/101291
Dec. 19, 2019 (EP) .................................... 19218142

(51) Int. Cl.
*H04S 7/00* (2006.01)

(52) U.S. Cl.
CPC ............ *H04S 7/30* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 8,045,840 | B2 | 10/2011 | Murata |
| 9,319,821 | B2 | 4/2016 | Arrasvuori |

(Continued)

FOREIGN PATENT DOCUMENTS

| | | | |
|---|---|---|---|
| FR | 3075443 | A1 | 6/2019 |
| WO | 2017191970 | A2 | 11/2017 |
| WO | 2018093193 | A1 | 5/2018 |

OTHER PUBLICATIONS

"Digital Audio Compression (AC-4) Standard;Draft ETSI TS 103 190", ETSI Draft; Draft ETSI TS 103 190, European Telecommunications Standards Institute (ETSI), 650, Route Des Lucioles ; F-06921 Sophia-Antipolis ; France, vol. Broadcast, No. V1.1.2, Feb. 13, 2014 (Feb. 13, 2014), pp. 1-282, XP014196481, Clause 4.3.3.3.5. on p. 66.

*Primary Examiner* — Harry S Hong

(57) ABSTRACT

A method for steering binauralization of audio is provided. The method comprises steps of: receiving (410) an audio input signal, calculating (430) a confidence value indicating a likelihood that a current audio frame of the audio input signal comprises binauralized audio; determining (450) a state signal based on the confidence value; determining (460) a steering signal, based on the first confidence value, the state signal and an energy value of the audio frame; and (Continued)

100 generating (470) an audio output signal with steered binauralization by processing the audio input signal according to the steering signal.

19 Claims, 6 Drawing Sheets

(56) References Cited

U.S. PATENT DOCUMENTS

| | | | | |
|---|---|---|---|---|
| 9,769,574 | B2 | 9/2017 | Kristensen | |
| 10,091,592 | B2 | 10/2018 | Chen | |
| 10,231,056 | B2 | 3/2019 | Poornachandran | |
| 10,244,342 | B1 | 3/2019 | Rasheed | |
| 2008/0205671 | A1 | 8/2008 | Oh | |
| 2016/0044432 | A1 | 2/2016 | Grosche | |
| 2018/0046431 | A1* | 2/2018 | Thagadur Shivappa | G06F 3/16 |
| 2018/0249277 | A1 | 8/2018 | Voss | |
| 2021/0012782 | A1* | 1/2021 | Pallone | G10L 19/008 |
| 2021/0056984 | A1 | 2/2021 | Zhang | |
| 2022/0141612 | A1* | 5/2022 | Eronen | H04S 7/303<br>381/17 |

* cited by examiner

STEERING OF BINAURALIZATION OF AUDIO

CROSS-REFERENCE TO RELATED APPLICATIONS

This application claims priority to International Patent Application No. PCT/CN2019/101291, filed 19 Aug. 2019; U.S. Provisional Patent Application No. 62/896,321, filed 5 Sep. 2019; European Patent Application No. 19218142.8, filed 19 Dec. 2019; and U.S. Provisional Patent Application No. 62/956,424, filed 2 Jan. 2020, which are incorporated herein by reference.

TECHNICAL FIELD

The present disclosure relates to the field of steering binauralization of audio. In particular, the present disclosure relates to a method, a non-transitory computer-readable medium and a system for steering binauralization of audio.

BACKGROUND

Today, it is common to implement spatial audio techniques into audio content to provide an immersive user experience. One of the most common techniques is binauralization. The binauralization uses a Head Related Transfer Function, HRTF, to produce virtual audio scenes, which may be reproduced by headphones or speakers. Binauralization may also be referred to as virtualization. The audio generated by a binauralization method may be referred to as binauralized audio or virtualized audio.

Electronic games have become popular with the rise of consumer entertainment devices, e.g., smart phones, tablets, PCs etc. In the gaming use case, binauralization is widely used to provide additional information to players. For example, binauralized gunshot sound clips in first-person shooting games may provide the directional information and indicate target position.

In the gaming use case, the binauralized audio may be generated dynamically either on the content creation side or on the playback side. On the content creation side, various game engines provide binauralization methods to binauralize the audio objects and mix them to the [un-binauralized] background sound. On the playback side, post-processing techniques may generate the binauralized audio as well.

However, in any of the above cases, care should be put in audio binauralization to avoid adverse effect on the audio which could result in a negative user experience.

SUMMARY

According to a first aspect there is provided a method of steering binauralization of audio. The method comprises the steps of: receiving an audio input signal, the audio input signal comprising a plurality of audio frames; calculating a confidence value indicating a likelihood that a current audio frame of the audio input signal comprises binauralized audio; determining a state signal based on the confidence value, the state signal indicating that the current audio frame being in an un-binauralized state or in a binauralized state; determining a steering signal, wherein, upon the state signal being changed from indicating the un-binauralized state to indicating the binauralized state: changing the steering signal to activate binauralization of audio by applying a head related transfer function, HRTF, on the audio input signal resulting in a binauralized audio signal, and generating an audio output signal, at least partly comprising the binauralized audio signal; wherein, upon the state signal being changed from indicating the binauralized state to indicating the un-binauralized state, setting a deactivation mode of binauralization to true; and upon the deactivation mode of the binauralization being true, and the confidence value of the current audio frame being below a deactivation threshold, and an energy value of the current audio frame being lower than energy values of a threshold number of audio frames of the audio input signal previous to the current audio frame: setting the deactivation mode of the binauralization to false, changing the steering signal to deactivate or reduce binauralization of audio, and generating the audio output signal at least partly comprising the audio input signal.

By steering the binauralization according to such a method, frequent switching of the audio output signal between the binauralized and un-binauralized audio input signal is avoided. It is desirable to avoid frequent switching as it could have an adverse effect on the audio and result in a negative user experience. For example, frequent switching could be jarring and cause discomfort for the user.

The steering also avoids dual-binauralization, i.e. binauralization post-processing of already binauralized audio, even if the audio input signal comprises a mix of un-binauralized background and short-term binauralized sound. It may be desirable to avoid dual-binauralization as it could have an adverse effect on the audio and result in a negative user experience. For example, the direction of a gunshot perceived by a game player could be incorrect when applying binauralization twice.

The steering further has a properly designed switching point, due to the check that that energy value of the current audio frame being lower than energy values of a threshold number of audio frames of the audio input signal previous to the current audio frame. This avoids a negative user experience. For example, if a period of continuous gunshot sound is detected as binauralized, the binauralizer should not be switched on immediately as it would make the gunshot sound unstable. This instability issue may be perceived significantly and be harmful for the overall audio quality.

According to an embodiment, upon the steering signal being changed to activate binauralization of audio, the step of generating the audio output signal comprises: for a first threshold period of time, mixing the binauralized audio signal and the audio input signal into a mixed audio signal and setting the mixed audio signal as audio output signal, wherein a portion of the binauralized audio signal in the mixed audio signal is gradually increased during the first threshold period, and wherein at an end of the first threshold period, the audio output signal comprises only the binauralized audio signal.

The mixed audio signal is beneficial in that it smooths the transition from the audio input signal to the binauralized audio signal such that abrupt changes are avoided, which may cause discomfort for the user.

The mixed audio signal optionally comprises the audio input signal and the binauralized audio signal as a linear combination with weights that sum to unity, wherein the weights may depend on a value of the steering signal. The weights that sum to unity are beneficial in that the total energy content of the audio output signal is not affected by the mixing.

According to another embodiment, upon the steering signal being changed to deactivate or reduce binauralization of audio, the step of generating the audio output signal comprises: for a second threshold period of time, mixing the binauralized audio signal and the audio input signal into a mixed audio signal and setting the mixed audio signal as audio output signal, wherein a portion of the binauralized audio signal in the mixed audio signal is gradually decreased during the second threshold period, and wherein at an end of the second threshold period, the audio output signal comprises only the audio input signal.

The mixed audio signal is beneficial in that it smooths the transition from the binauralized audio signal to the audio input signal such that abrupt changes are avoided, which may cause discomfort for the user.

The mixed audio signal optionally comprises the audio input signal and the binauralized audio signal as a linear combination with weights that sum to unity, wherein the weights may depend on a value of the steering signal. The weights that sum to unity are beneficial in that the total energy content of the audio output signal is not affected by the mixing.

According to yet another embodiment, the step of calculating a confidence value comprises extracting features of the current audio frame of the audio input signal, the features of the audio input signal comprise at least one of inter-channel level differences, ICLDs, inter-channel phase differences, ICPDs, inter-channel coherences, ICCs, mid/side Mel-Frequency Cepstral Coefficients. MFCC, and a spectrogram peak/notch feature, and calculating the confidence value based on the extracted features.

The extracted features are beneficial in that they allow a more precise calculation of the confidence value.

According to one more embodiment, the step of calculating a confidence value further comprises: receiving features of a plurality of audio frames of the audio input signal previous to the current audio frame, the features corresponding to the extracted features of the current audio frame; applying weights to the features of the current and the plurality of previous audio frames of the audio input signal, wherein the weight applied to the features of the current audio frame is larger than the weights applied to the features of the plurality of previous audio frames, and calculating the confidence value based on the weighted features.

The weights are beneficial in that they prioritize newer frames, especially the current frame, which makes the result more responsive to change in the features calculated from the frames.

According to yet one more embodiment, the step of calculating a confidence value further comprises: applying weights to the features of the current and the plurality of previous audio frames of the audio input signal according to an asymmetric window function.

The assymmetric window function is beneficial in that it is a simple and reliable way to apply different weights to the audio frames. The asymmetric window may e.g. be the first half of a Hamming window.

According to a second aspect there is provided a non-transitory computer-readable medium storing instructions that, upon execution by one or more computer processors, cause the one or more processors to perform the method of the first aspect.

According to a third aspect there is provided a system for steering binauralization of audio. The system comprises: an audio receiver for receiving an audio input signal, the audio input signal comprising a plurality of audio frames; a binauralization detector for calculating a confidence value indicating a likelihood that a current audio frame of the audio input signal comprises binauralized audio; a state decider for determining a state signal based on the confidence value, the state signal indicating that the current audio frame being in an un-binauralized state or in a binauralized state; a switching decider for determining a steering signal, wherein, upon the state decider changing the state signal from indicating the un-binauralized state to indicating the binauralized state, the switching decider is configured to: change the steering signal to activate binauralization of audio by applying a head related transfer function, HRTF, on the audio input signal resulting in a binauralized audio signal, and generate an audio output signal, at least partly comprising the binauralized audio signal; wherein, upon the state decider changing the state signal from indicating the binauralized state to indicating the un-binauralized state, the switching decider sets a deactivation mode of binauralization to true; and upon the deactivation mode of the binauralization being true, and the confidence value of the current audio frame being below a deactivation threshold, and an energy value of the current audio frame being lower than energy values of a threshold number of audio frames of the audio input signal previous to the current audio frame, the switching decider is configured to: set the deactivation mode of the binauralization to false, change the steering signal to deactivate or reduce binauralization of audio, and generate the audio output signal at least partly comprising the audio input signal.

The second and third aspect may generally have the same features and advantages as the first aspect.

BRIEF DESCRIPTION OF THE DRAWINGS

By way of example, embodiments of the present disclosure will now be described with reference to the accompanying drawings, in which.

DETAILED DESCRIPTION

Figure 1:
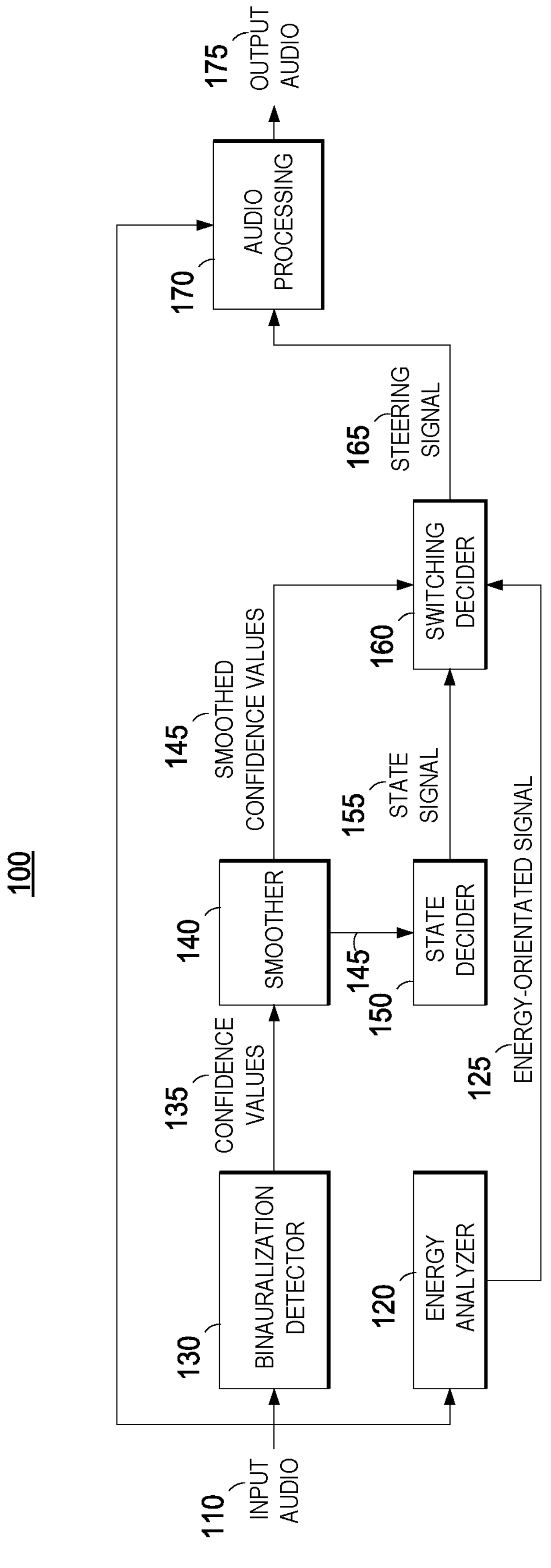
FIG. 1 is a block diagram of an example system of steering binauralization.

Embodiments of the disclosure will now be described with reference to the accompanying drawings. The disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. The terminology used in the detailed description of the particular embodiments illustrated in the accompanying drawings is not intended to be limiting of the disclosure. In the drawings, like numbers refer to like elements.

Conventional binauralization techniques use a binauralization detection module and a mixing module for generating binauralized audio. This method works well for general entertainment content like movies. However, it is not suitable for the gaming use case due to the difference between the gaming content and other entertainment content [e.g., movie or music].

The general gaming content contains much short-term binauralized sound. This is due to the special binauralization methods used for gaming content. In general, a binauralized movie content is obtained by applying the binauralizers for all of the audio frames, sometimes all at once. For gaming content, however, the binauralizers are usually applied for specific audio objects [e.g., gunshot, footstep etc.], which usually sparsely appears over time. That is, in contrast to the other types of binauralized content with relatively long binauralized periods, the gaming content has a mix of un-binauralized background and short-term binauralized sound.

A binauralization detection module is beneficial for the playback side binauralization method to handle binauralized or un-binauralized audio adaptively. This module usually employs Media Intelligence, MI, techniques and provides confidence values representing the probabilities of a signal being binauralized or not. MI is an aggregation of technologies using machine learning techniques and statistical signal processing to derive information from multimedia signals.

The binauralization detection module may analyze audio data frame by frame in real time and output confidence scores relating to a plurality of types of audio [for example: binauralizing/dialogue/music/noise/VOIP] simultaneously. The confidence values may be used to steer the binauralization method.

Thusly, the present disclosure strives to solve at least some of the above problems and to eliminate or at least mitigate some of the drawbacks of prior-art systems.

A further object of the present disclosure is to provide a binauralization detection method that avoids relatively frequent switching.

Starting in FIG. 1, a block diagram of an example system 100 implementing a method for steering binauralization of audio is shown.

The input to the system 100 is an audio input signal 110. The audio input signal 110 comprises a plurality of audio frames, which may comprise foreground binaural audio only, background non-binaural audio only or a mix of both. The input signal 110 may be uncompressed or compressed. A compressed and/or encoded signal may be uncompressed and/or decoded [not shown in FIG. 1] before performing the method for steering binauralization of audio.

The audio input signal 110 is input to a binauralization detector 130. The binauralization detector 130 outputs confidence values 135 indicating a likelihood that the input audio comprises binauralized audio. The confidence value 135 is optionally normalized to be between zero and one, where zero indicates no likelihood that the audio input signal 110 comprises binauralized audio and one indicates total likelihood that the audio input signal 110 comprises binauralized audio.

The binauralization detector 130 may implement a step of calculating the confidence value 135 that comprises extracting features of the audio input signal 110 indicative of binauralized audio.

The features are optionally extracted in the frequency domain, which indicates that they are transformed before the extraction and reverse transformed after the extraction. The transform comprises a domain transformation to decompose the signals into a number of sub-bands [frequency bands].

According to a specific implementation, the binauralization detector 130 transforms each frame of each channel into sixty-four complex quadrature mirror filter domain sub-bands, and further divides the lowest three sub-bands into sub-sub-bands as follows: the first sub-band is divided into eight sub-sub-bands, the second and third sub-bands are each divided into four sub-sub-bands.

The features of the audio input signal indicative of binauralized audio may comprise at least one of inter-channel level difference, ICLD, inter-channel phase difference, ICPD, inter-channel coherence, ICC, mid/side Mel-Frequency Cepstral Coefficients. MFCC, and a spectrogram peak/notch feature.

Inter-channel level difference, ICLD, is a measurement proportional to a decibel difference of the sub-band sound energies of two different sub-bands. ICLD, which is $\Delta L(k)$ in the frequency domain, may be calculated according to:

$$\Delta L(k)_{12} = 10\log_{10}\frac{x_1(x)x_1^*(k)}{x_2(x)x_2^*(k)},$$

where $x_1(k)$ and $x_2(k)$ are two input signal sub-bands in the frequency domain and * denotes complex conjugation.

Inter-channel phase difference, ICPD, is a measurement of the phase difference of two sub-bands. ICPD, $\phi(k)$ in the frequency domain, may be calculated according to $\phi(k)_{12}=\angle L(x_1(k)x^*_2(k))$, where $\angle$ denotes a directional angle of a complex number.

Inter-channel coherence, ICC, is a measurement of the coherence of two sub-bands. ICC, c(k) in the frequency domain, may be calculated according to $$c(k) = \max_d|\Phi_{12}(d, k)|,$$

where $\Phi_{12}(d,k)$ is the normalized cross-correlation function $$\Phi_{12}(d, k) = \frac{p_{x_1x_2}(d, k)}{\sqrt{p_{x_1}(k-d_1)p_{x_2}(k-d_2)}},$$

where $d_1=\max\{-d, 0\}$, $d_2=\max\{d, 0\}$, d is a time difference between the two input signal sub-bands and p is a short-time estimation of the mean energy, i.e. $p=x_1(k-d_1)x_2(k-d_2)$.

Mid and side Mel-Frequency Cepstral Coefficients (MFCCs) may include spectrogram modifications caused by HRTF (head related transfer functions). The procedures to extract these features includes:

1. Mid and Side signals $A_M$ and $A_S$ are obtained from left and right channel signals, according to:

$$A_M=0.5*(X_{left}+X_{right})$$

$$A_S=0.5*(X_{left}-X_{right})$$

2. Mel-Frequency Cepstral Coefficients (MFCCs) are then calculated according to an approach found in classic text books (e.g. Theory and Applications of Digital Speech Processing by Rabiner and Schafer).

The HRTF filtering causes peaks and notches in the spectorgram in some frequency ranges (5~13 kHz). Such spectrogram peak and notch features may be helpful to find spectral modification by HRTF. Spectral peak/notch features may be calculated for each channel with the following procedure:

1. Find the local maximum and minimum of signal magnitude in log domain and identify the number of maximum $Num_{max}$ and minimum values $Num_{min}$ in the specific frequency range (e.g. 5~13 kHz)

The local maximum need meet the following conditions:

$$a)X_{max}-X_{-}\geq MAX_{thresh}$$

$$b)X_{max}-X_{+}\geq MAX_{thresh}$$

Where $X_-$ and $X_+$ are left and right value of the local maximum or minimum), and $MAX_{thres}$ is a chosen threshold.

The local minimum needs meet the following conditions:

$$a) X_{min} - X_- \leq MIN_{thresh}$$

$$b) X_{min} - X_+ \leq MIN_{thresh}$$

where $MIN_{thres}$ is a chosen threshold

2. Normalize $Num_{max}$ and $Num_{min}$ by a predefined value $NUM_{norm\_factor}$ to make it in the range of [0,1]

$$Num_{max\_norm} = Num_{max} / NUM_{norm\_factor}$$

$$Num_{min\_norm} = Num_{min} / NUM_{norm\_factor}$$

These features are disclosed as being calculated for two sub-bands, however any two sub-bands and/or sub-sub-bands may be chosen and optionally the features are calculated for several pairs of sub-bands and/or sub-sub-bands, possibly combining them to a single mean or average measurement. In one embodiment, these features are calculated for all sub-bands, wherein if a feature is not able to be accurately calculated for at least one sub-band, any such sub-band is ignored.

In another embodiment, only specific ranges of sub-bands are used for specific features, wherein other ranges and uncalculable sub-bands within these ranges are ignored. For example, with 77 hybrid complex quadrature mirror filter, HCQMF, bands, only ranges of sub-bands 1-9 and 10-18 may be used for calculating ICC and ICPD and sub-bands 19-77 are ignored.

The extracted features of the audio input signal 110 indicative of binauralized audio may be accumulated into weighted histograms. The weighted histogram applies a weight to the count. In this embodiment, the step of calculating a confidence value further comprises: accumulating the features of the current and a pre-determined number of previous audio frames of the audio input signal into a weighted histogram that weights each sub-band used to calculate the features according to the total energy in that sub-band, and calculating the confidence value based on the mean value or standard variation of the weighted histogram, e.g. by using them as input in machine learning methods as explained below.

The weighted histograms comprise features from a predetermined number or frames, such as 24, 48, 96 or any other suitable number. The frames are optionally sequential starting from the current frame and counting backwards. The weighted histograms provide a good overview of the extracted features of the audio input signal from several different frames.

In one embodiment, two different weights are multiplied and applied to the histogram. One weights the counts according to each frequency band energy ratio inside the sub-band and the other weights the counts according to the ratio of each sub-band energy in respect to the total sub-band energy of all sub-bands.

The weighted histograms may be calculated according to:

$$h(i) = \frac{\Sigma_{k \in K_i} g_F(k) g_P(k)}{\Sigma_{k \in [k_b]} g_F(k) g_P(k)},$$

wherein i=1, . . . , $n_{BarsPerHist}$, $n_{BarsPerHist}$ is the number of bars in the histogram, $$K_i = \left\{ k \in \{k_b\} \mid i = \left\lfloor \frac{|r'(k)|}{\max(|r'(k)|)} \cdot n_{BarsPerHist} \right\rfloor \right\},$$

wherein frequency band energy weighting is $$g_F(k) = \frac{p(k)}{\sum_{k \in \{k_b\}} p(k)}, \; k \in \{k_b\},$$

parameter band energy weighting is $$g_P(k) = \frac{\sum_{k \in \{k_b\}} p(k)}{\sum_{allk} p(k)},$$

$k \in \{k_b\}$, wherein p(k) is the energy of sub-band k, $\{k_b\}$ is parameter bands, r'(k) is partially ignored features r(k).

The binauralization detector 130 may further implement a machine learning classifier that transforms the input as a function of at least one parameter estimated from training data and outputs the confidence value 135. The input may be the audio input signal directly or extracted features thereof, such as the ones exemplified above.

In one embodiment, the step of calculating a confidence value 135 comprises: inputting extracted features of the current audio frame of the audio input signal 110, and features of a plurality of audio frames of the audio input signal 110 previous to the current audio frame if received or calculated, into a machine learning classifier, wherein the machine learning classifier is trained to output a confidence value 135 based on the input.

The machine learning classifier may be trained to learn how to process the input into the confidence value 135 and is optionally supervised with the confidence value 135 as a class.

The machine learning classifier may be trained previously or with a training set that is branched off of the same data being input into the binauralization detector 130.

The classifier is beneficial in that it makes the calculation of the confidence value 135 more precise. The classifier may be implemented using e.g. AdaBoost, k-nearest neighbour, k means clustering, support vector machine, regression, decision tree/forest/jungle, neural network and/or naïve Bayes algorithms.

The classifier may e.g. be an AdaBoost model. Real values between [−∞, ∞] may be obtained from an AdaBoost model, as such a sigmoid function may be used to map the obtained result to the range of a confidence value being [0, 1]. An example of such a sigmoid function is:

$$\frac{1}{1 + e^{Ax+B}},$$

where x is me output score from AdaBoost and A and B are two parameters that are estimated from a training data set by using any well-known technology.

The binauralization detector 130 may further apply a weight to the audio input signal when calculating the confidence value 135, wherein the weight of the current audio frame is larger than the weight of a previous audio frame.

This may be implemented in that the step of calculating a confidence value 135 further comprises: receiving features of a plurality of audio frames of the audio input signal 110 previous to the current audio frame, the features corresponding to the extracted features of the current audio frame; applying weights to the features of the current and the plurality of previous audio frames of the audio input signal 110, wherein the weight applied to the features of the current audio frame is larger than the weights applied to the features of the plurality of previous audio frames, and calculating the confidence value based on the weighted features.

The received features of a plurality of audio frames may be extracted from e.g. metadata or calculated in a similar manner as the features of the current audio frame.

A larger weight for the current audio frame than the previous audio frame gives precedence to newer frames, especially the current frame, which makes the binauralization detector 130 more responsive to change.

The weight may be implemented as a constant or function in the calculation of the confidence value 135. The weight may be implemented as an asymmetric window comprising the current audio frame and the most recent audio frames of the audio input signal 110.

Conventional binauralization detection methods calculate features based on the statistics of a window that contains several consecutive frames. However, it treats each frame equally, which leads to latency being no less than the half of the window length, which is too large for gaming content. This is because if all frames of the window are equally weighted, at least half of the frames of the window are indicative of binauralization upon the binauralization detector 130 reacting to it. By weighting the confidence values as described herein, reduces the latency of the steering of binauralization of audio.

The weights may be implemented in that the step of calculating a confidence value 135 further comprises: applying weights to the features of the current and the plurality of previous audio frames of the audio input signal 110 according to an asymmetric window function.

The asymmetric window may be a first half of a Hamming window, Hann window or triangle window.

The weights may be applied to a pre-determined number or frames, such as 24, 48, 64, 96 or any other suitable number depending on the accuracy requirements of the specific embodiment. The frames are optionally sequential starting from the current frame and counting backwards.

The binauralization detector 130 may thus be specifically adapted for gaming content in that it has relatively low latency and is relatively highly adaptive to change.

Some binaural audio events that may occur in gaming have very short duration (e.g. a gunshot). This causes problems for a feature based classifier with a relatively long window length (audio clip). Though a shorter feature window (shorter clip) could be used to handle this situation, the performance in general (e.g. latency) would deteriorate because the classifier will make its decisions based on a shorter clip.

In order to address this problem, some embodiments of the invention apply a dynamic frame feature weighting scheme. According to this approach, a frame feature weight is based on frame energy ratio of the frame with respect to the clip where this frame belongs. The weight will thus be larger for high energy frames.

Such dynamic weighting may be implemented by first determining if the audio clip includes any impulse-like frames (i.e. frames with a noticably higher energy than other frames). In a two-channel implementation, this determination may be achieved by:

1. Calculate average frame energy of left and right channel for each frame i in one dip (N frames)

$$E_i = 0.5*(E_{left,i} + E_{right,i}),\ i = 1, \ldots N,$$

where $E_{left}$ and $E_{right}$ are the energies of frame i in the left and right channels respectively, 2. Calculate frame energy ratio, $R_i$, as $$R_i = \frac{E_i}{\sum_{i=1}^{N} E_i}$$

3. Conclude that a frame i is impulse-like if and only if:
   1) $R_i > R_{threshold}$
   2) $E_i > E_{threshold}$ where $R_{threshold}$ and $E_{threshold}$ are first and second threshold values defining the term "impulse-like".

If a frame is found to be impulse-like, this may be indicated by setting a flag P=1. For clips without any such frames, the weighting may be as described elsewhere. However, for clips that include a frame having the flag P=1, dynamic weights may be determined according to:

1) Calculate the maximum and minimum value of average frame energy in log domain, MinE(dB) and MaxE(dB).

2) Calculate frame feature weight for each frame i $$\text{weight}_i = \left(\frac{E_i(\text{dB}) - MinE(\text{dB})}{MaxE(\text{dB}) - MinE(\text{dB})}\right)^{\alpha},\ i = 1, \ldots N$$

Where α is an exponent, e.g. equal to 3.

3) Apply dynamic weights to frame feature vector $fea_i$ when calculating mean and standard deviation for the feature vector;

$$\text{mean} = \frac{\sum_{i=1}^{N} (fea_i * \text{weight}_i)}{\sum_{i=1}^{N} \text{weight}_i}$$

$$std = \frac{\sum_{i=1}^{N} (fea_i - \text{mean}) * ((fea_i - \text{mean}) * \text{weight}_i)}{\sum_{i=1}^{N} \text{weight}_i}$$

Calculating the confidence value may optionally comprise inputting the calculated confidence value into a smoother 140. Smoothing stabilizes the confidence value such that abrupt changes are smoothed to less abrupt changes. The smoothing is beneficial in that abrupt changes impact the steering less, which may otherwise cause rapid fluctuations that are uncomfortable for a user.

This may be implemented in that the step of calculating a confidence value comprises: receiving a confidence value of an audio frame immediately preceding the current audio frame; adjusting the confidence value of the current audio frame using a one-pole filter wherein the confidence value of the current audio frame and the confidence value of an audio frame immediately preceding the current audio frame are inputs to the one-pole filter and the adjusted confidence value 145 is an output from the one-pole filter.

The one-pole filter is beneficial in that it is an efficient way to increase the speed and limit the response time of the smoothing. One technical effect of the one-pole filter is that only the confidence value of one previous frame is used, which reduces the number of frames that are checked, thereby reducing latency.

An example of a one-pole filter is: $y(n)=ay(n-1)+(1-a)x(n)$, where $y(n)$ is the smoothed confidence value 145 of the current frame, $y(n-1)$ is the smoothed confidence value 145 of the previous frame, $x(n)$ is the [un-smoothed] confidence value 135 of the current frame, and a is a constant. a may be dependent on the sample rate of the audio signal, $F_s$, and/or the period of smoothing, $\tau$, for example $a=1/2^{1/(\tau F_s)}$, wherein $\tau$ is an RC time constant $$\tau = RC = \frac{1}{2\pi f_c},$$

wherein $f_c$ is a cutoff frequency.

The RC time constant is the charging or discharging rate of a resistor-capacitor circuit corresponding to the processing circuit performing the step of calculating a confidence value, i.e. the smoother 140 in this embodiment.

The one-pole filter may have a smoothing time lower than a smoothing threshold, wherein the smoothing threshold is determined based on the RC time constant. The smoothing threshold ensures that the period of smoothing is not too long and that the response time of the smoothing 440 is relatively low.

The confidence value [smoothed 145 or not smoothed 135] is input into a state decider 150. The state decider 150 implements the step of determining a state signal 155 of the method for steering binauralization of audio. The state signal 155 indicates whether the current audio frame is in an un-binauralized state or in a binauralized state.

The state decider 150 determines whether the state of the audio, the state of being binauralized or un-binauralized, has recently changed. Recent may comprise within a pre-determined number of previous frames, such as the previous 1, 2, 3, 5, 10 or any suitable number of previous frames.

The state decider 150 is optionally a four-state state machine, exemplified in FIG. 2 and further described below, wherein two states of the four-state state machine correspond to the state signal 155 indicating that the current audio frame is in an un-binauralized state and the remaining two states of the four-state state machine correspond to the state signal 155 indicating that the current audio frame is in a binauralized state.

The four-state state machine comprises an un-binauralized holding state, UBH, 210 a binauralized holding state, BH, 230 a binauralized release counting state, BRC, 240 and a binauralized attack counting state, BAC 220; wherein UBH 210 and BAC 220 correspond to the state signal 155 indicating that the current audio frame is in an un-binauralized state and BH 230 and BRC 240 correspond to the state signal indicating that the current audio frame is in a binauralized state.

BAC 220 implements a short-term accumulator with a slack counting rule to determine when the state signal transitions, d, from BAC 220 to BH 230, i.e. from indicating that the current audio frame is in an un-binauralized state to indicating that the current audio frame is in a binauralized state. The accumulator will e.g. continue counting, c, any confidence value above a confidence threshold until a pre-determined number is reached. The accumulator is short-term in that it is implemented over a relatively short pre-set period such as five seconds, i.e. that the short-term accumulator optionally uses a slack counting rule so that it is relatively easy to exit the BAC 220 state.

BRC 240 implements a long-term monitor using a tight counting rule to determine when the state signal transitions, i, from BRC 240 to UBH 210, i.e. from indicating that the current audio frame is in a binauralized state to indicating that the current audio frame is in an un-binauralized state. The monitor will e.g. check, h, if a pre-determined number of previous confidence values are below a confidence threshold. The monitor is long-term in that it is implemented over a relatively long pre-set period such as twenty seconds, i.e. that the long-term monitor optionally uses a tight counting rule so that it is relatively hard to exit the BRC 240 state.

This difference between the short-term accumulator and the long-term monitor reduces a missing error of short-term binauralized sound detection common in the prior art.

The four-state state machine is beneficial in that it further stabilizes the output 155 of the state determining step. This avoids frequent switching between the binauralized and un-binauralized state, which may otherwise be disturbing to a user.

The four-state state machine will be discussed further below with regards to FIG. 2.

The input audio 110 may be further input into an energy analyzer 120. The energy analyzer 120 analyzes audio energy of the audio input signal and provides information for the switching decider 160. In another embodiment, the audio energy of the audio input signal 110 is received e.g. via metadata of the audio input signal 110.

The energy of a signal corresponds to the total magnitude of the signal. For audio signals, that roughly corresponds to how loud the signal is. For example, the energy for an audio frame may be calculated as a sum of the squared absolute values of the amplitudes, normalized by the frame length.

In one embodiment the energy value $x(t)$ of the current frame t is calculated by the energy analyzer 120. The root mean square of the energy value $x(t)$ over a pre-determined number of frames N may be calculated by:

$$\sqrt{\frac{1}{N}\sum_{t=1}^{N} x^2(t)}.$$

The pre-determined number of frames N may be any suitable number, such as N=1, 2, 8, 16, 48, 512, 1024, 2048. In another embodiment, the energy value for the current frame is received in conjunction with the audio input signal, for example as metadata.

In one embodiment the short-term energy $p(t)$ of the frame t is calculated by the energy analyzer 120. A smoothed energy signal $\overline{p}(t)$ may be calculated by: $\overline{p}(t)=\alpha_{enengy}p(t)+(1-\alpha_{energy})\overline{p}(t-1)$, where $\alpha_{enengy}$ is a is a smoothing coefficient. $\alpha_{enengy}$ may e.g. be 0.8, 0.9, 0.95, 0.99 or any other proper fraction.

The root mean square of the energy value and/or the smoothed energy signal $\overline{p}(t)$ or any other suitable energy information is then output as an energy-orientated signal 125 to the switching decider 160.

The switching decider 160 implements the step of determining a steering signal 165 of the method for steering binauralization of audio. The switching decider 160 has inputs of the confidence value 135, 145 being the result of the binauralization detector 130, the state signal 155 being the result of the state decider 150, and an energy-orientated signal 125 either being the result of the energy analyzer 120 or received through other means, such as from metadata.

The step of determining a steering signal 165 comprises, upon the state signal 155 being changed from indicating the un-binauralized state to indicating the binauralized state: changing the steering signal 165 to activate binauralization of audio by applying a head related transfer function, HRTF, on the audio input signal 110 resulting in a binauralized audio signal, and generating an audio output signal 175, at least partly comprising the binauralized audio signal.

The step of determining a steering signal 165 further comprises, upon the state signal 155 being changed from indicating the binauralized state to indicating the un-binauralized state, setting a deactivation mode of binauralization to true; and upon the deactivation mode of the binauralization being true, and the confidence value 135, 145 of the current audio frame being below a deactivation threshold, and an energy value of the current audio frame being lower than energy values of a threshold number of audio frames of the audio input signal 110 previous to the current audio frame: setting the deactivation mode of the binauralization to false, changing the steering signal 165 to deactivate or reduce binauralization of audio, and generating the audio output signal 175 at least partly comprising the audio input signal 110.

The deactivation mode is beneficial in that changing the steering signal 165 to deactivate or reduce binauralization of audio does not immediately occur unless the confidence value 135, 145 of the current audio frame is below a deactivation threshold, and an energy value of the current audio frame is lower than energy values of a threshold number of audio frames of the audio input signal 110 previous to the current audio frame.

This avoids frequent switching between the binauralized and the un-binauralized state because of the requirement of the deactivation threshold delays the switching, also e.g. a sudden and temporary drop in confidence value is ignored if it never reaches the threshold. The deactivation threshold value may be pre-set, or user defined.

This also avoids significant changes during high-energy periods because of the comparison of the energy value of the current audio to energy values of previous audio frames, which prevents an inconsistent listening experience.

Figure 3A:
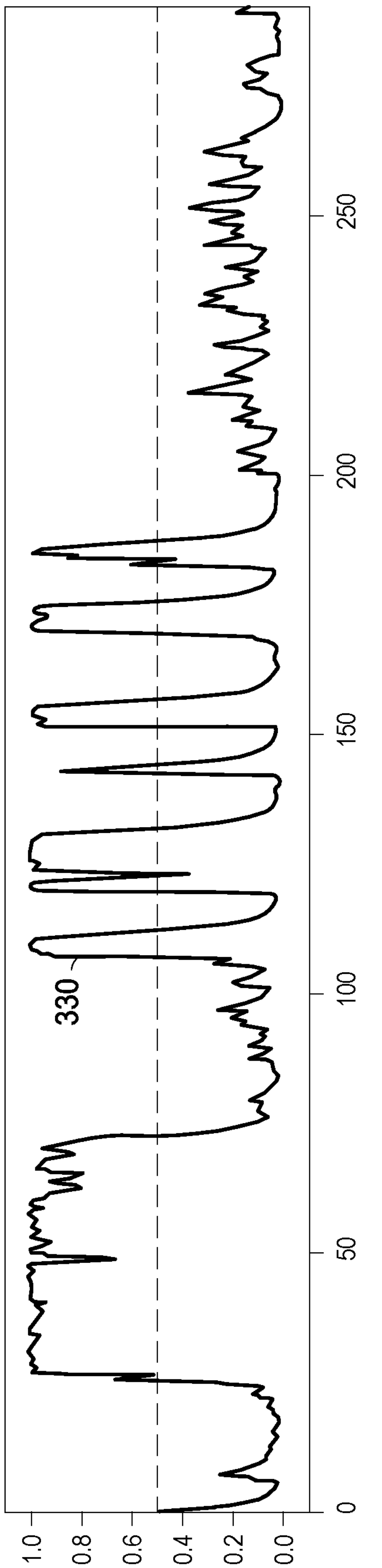
FIG. 3A illustrates example confidence values.
Figure 3B:
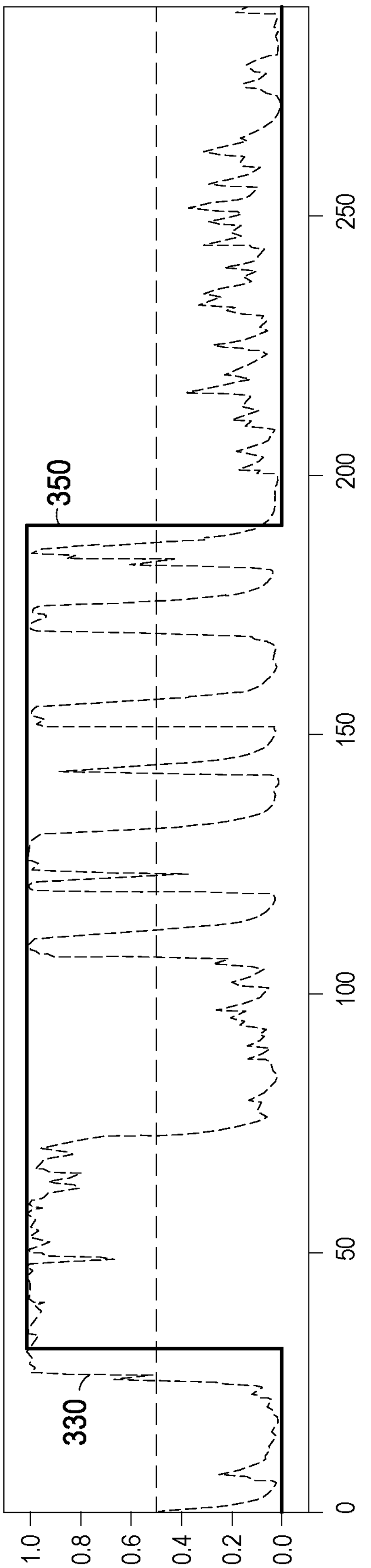
FIG. 3B illustrates an example state signal.
Figure 3C:
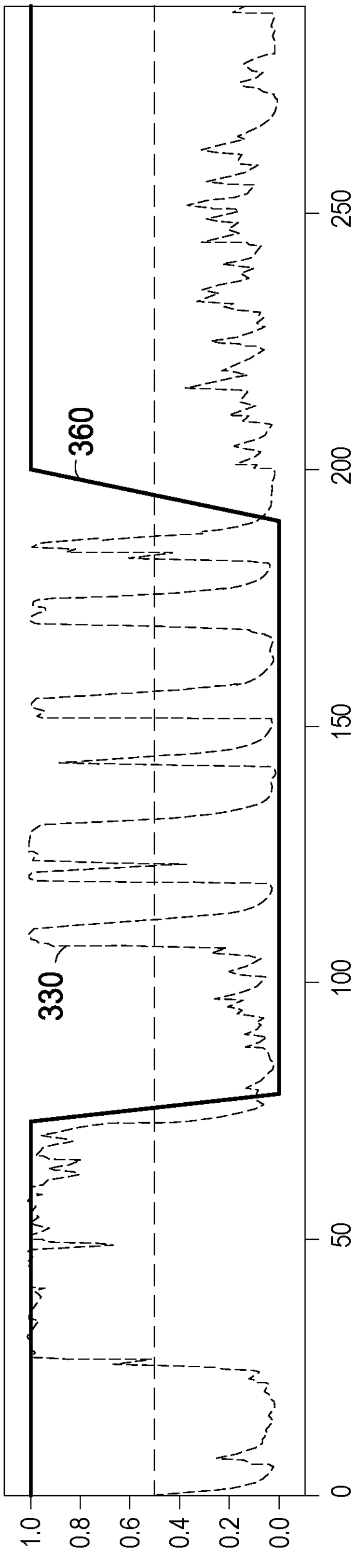
FIG. 3C illustrates an example steering signal.

Further details of the step of determining the steering signal 165 will be disclosed with regards to FIG. 3C.

In the final step of the method for steering binauralization of audio implemented by the system 100 of FIG. 1, a step of generating audio output 175 with steered binauralization is performed by audio processing 170. The step of generating audio output is steered by the steering signal and may be performed by the switching decider 160 or a separate audio processor 170. The audio processing comprises applying a HRTF on the audio input signal 110 when needed (according to the above), resulting in a binauralized audio signal.

Figure 2:
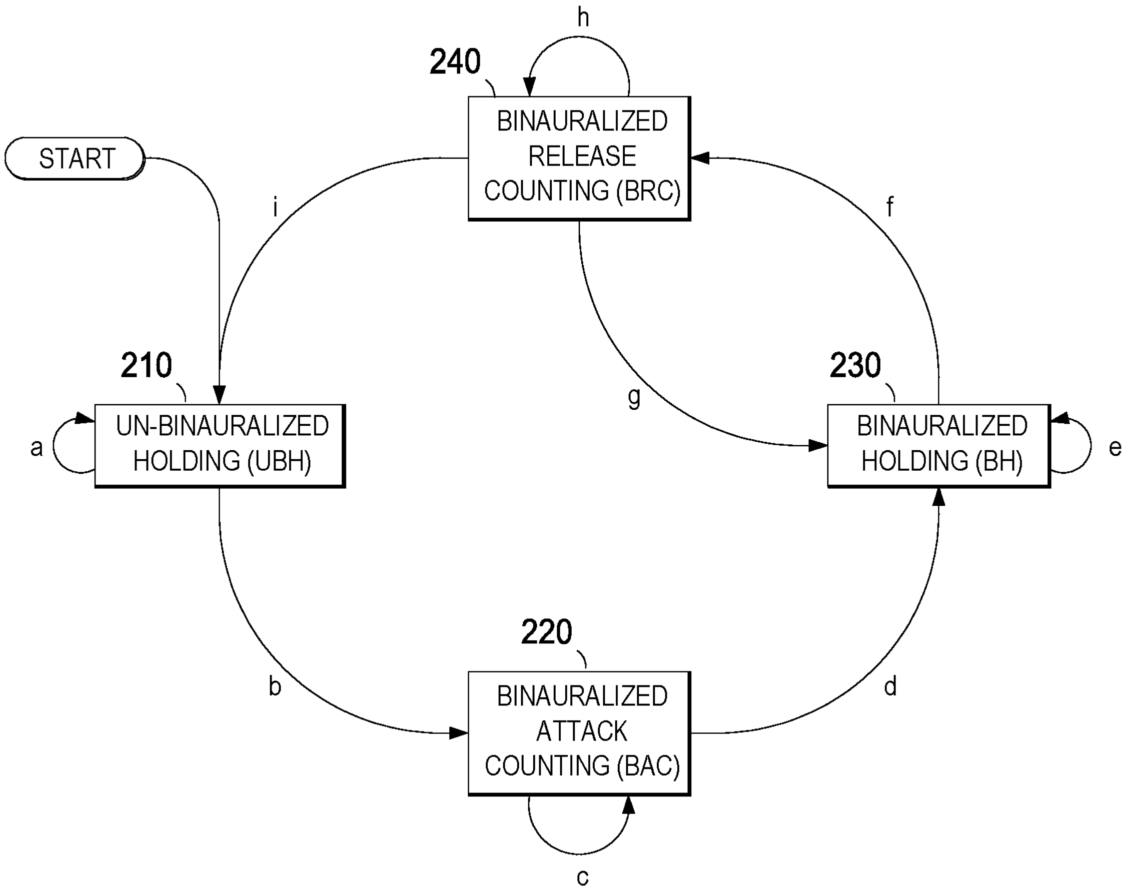
FIG. 2 is a diagram of an example four-state state machine.

FIG. 2 shows a four-state state machine according to an embodiment, which implements the step of determining a state signal of the method for steering binauralization of audio.

The state signal is a binary function with the range of zero to one. The value of the state signal being zero indicates that the audio input signal comprises an un-binauralized state while the value of the state signal being one indicates that the audio input signal comprises a binauralized state. The state signal aims to prevent frequent switching between the binauralized and un-binauralized state from the confidence values by rounding the confidence values into stretches of one or zero.

The state of the state machine transitions from UBH 210 to BAC 220 upon the confidence value being above a confidence threshold, the state transitions from BAC 220 to BH 230 upon a threshold number of frames having a confidence value above a confidence threshold while the state is BAC 220 being reached, the state transitions from BH 230 to BRC 240 upon the confidence value being below a confidence threshold and the state transitions from BRC 240 to UBH 210 upon a pre-determined number of consecutive frames having a confidence value below a confidence threshold.

In the following, a use case of the state machine of FIG. 2 will be described. This is intended only as a non-limiting example to further illustrate the functions of the different states. The initial state of the state machine is UBH 210 in this example, however e.g. BH 230 may also be selected as an initial state.

Given the last state being UBH 210, which is also the case if the UBH 210 state is the initial state, if the confidence value is smaller than a confidence threshold $T_{high}$, the state will be kept [arrow a in FIG. 2] and the state signal will be set to or kept as zero. In an embodiment, $T_{high}$ is 0.6, though any other proper fraction is possible.

If the confidence value is higher than or equal to the confidence threshold $T_{high}$, the state will change to the BAC 220 state [arrow b in FIG. 2] while the state signal will be kept as zero.

While the last state is the BAC 220 state, the short-term accumulator is active. The accumulator saves the count of the confidence values that are higher than a confidence threshold $T_{medianLow}$. If the count is smaller than a pre-determined count threshold $N_{acc}$, the accumulator will keep counting while the state is kept as the BAC 220 state [arrow c in FIG. 2] and the state signal is kept at zero. In an embodiment, $T_{medianLow}$ is 0.45, though any other proper fraction is possible. In an embodiment, $N_{acc}$ is a number of frames corresponding to 5 seconds, though any other number of frames is possible.

Once the count of the accumulator is equal to or greater than the pre-determined count threshold $N_{acc}$, the state will be changed to the BH 230 state [arrow d in FIG. 2]. Meanwhile, the state signal will be set to one and the accumulator will be reset.

If the last state is the BH 230 state, if the confidence value is equal to or higher than a confidence threshold $T_{low}$, the state will be kept [arrow e in FIG. 2] and the state signal will be kept at one. In an embodiment, $T_{low}$ is 0.25, though any other proper fraction is possible.

If the confidence value is lower than the confidence threshold $T_{low}$, the state will change to the BRC 240 state [arrow fin FIG. 2] while the state signal will be kept as one.

While the last state is the BRC 240 state, the long-term monitor is active. The monitor checks if the most recent consecutive confidence values are all smaller than a confidence threshold $T_{medianHigh}$. If any confidence value that is higher than or equal to $T_{medianHigh}$ appears, the state will change back to BH 230 [arrow g in FIG. 2] while the state signal is kept as one. In an embodiment, 20 seconds of recent consecutive confidence values are checked, though any other number of seconds is possible. In an embodiment, $T_{medianHigh}$ is 0.55, though any other proper fraction is possible.

While the confidence values are smaller than a confidence threshold $T_{medianHigh}$, the state is kept as BRC 240 [arrow h in FIG. 2] and the monitor keeps waiting until the full span of consecutive confidence values are checked.

Once the monitor has observed consecutive confidence values are all smaller than a confidence threshold $T_{medianHigh}$, the state will change to UBH 210 [arrow i in FIG. 2]. Meanwhile, the state will be set to zero and the monitor will be reset.

FIG. 3A shows example confidence values 330 over time. The confidence values 330 shown are smoothed confidence values, however they could be non-smoothed as well.

FIG. 3B shows an example state signal 350 resulting from the example confidence values 330 of FIG. 3A. Note that the state changes 350 from zero to one only after a few seconds of high confidence values 330, corresponding to the BAC 220 accumulator reaching the pre-determined count threshold $N_{acc}$ and changing state to BH 230.

Further, the state signal 350 does not change from one to zero as soon as the confidence value 330 lowers, because the consecutive requirement of the long-term monitor corresponding to the BRC 240 state is not achieved and hence the state machine does not move to the UBH 210 state until later.

As such, the aim of the state signal 350 to prevent frequent switching between the binauralized and un-binauralized state is achieved.

FIG. 3C shows an example steering signal 360 resulting from the example confidence values 330 of FIG. 3A and the example state signal 350 of FIG. 3B.

The steering signal 360 steers the processing of the audio. If the steering signal 360 is zero, no processing occurs. Consequently, the audio input signal is outputted as is as the audio output signal. If the steering signal 360 is one, binauralization processing occurs by applying a head related transfer function, HRTF, on the audio input signal resulting in a binauralized audio signal as the audio output signal. If the steering signal 360 is between zero and one, a mix occurs, and a mixed audio signal is outputted as the audio output signal. A steering signal 360 between zero and one may e.g. be caused by an intermediate ramp between a zero and one state, to be discussed further below.

In order to avoid dual-binauralization, as it could have an adverse effect on the audio and result in a negative user experience, an object of the invention is for processing to occur only for audio frames of the audio input signal that does not already comprise binauralized sound.

As such, many prior art steering signals correspond to the inverse of the confidence values or state signal. The inventors have realized however, that the switching point of the steering signal 360 from one to zero, and optionally vice versa, should be properly designed to avoid instability issues.

The switching point of the steering signal 360 should not be selected during the dense and loud binauralized sound period, because immediately switching on/off the HRTF in that period would lead to an inconsistent listening experience.

The step of determining a steering signal 360 like the example steering signal 360 in FIG. 3C thus comprises, beyond observing changes in the state signal 350, comparing the confidence value 330 of the current audio frame to a deactivation threshold, and comparing the energy value of the current audio frame to energy values of previous audio frames.

The example steering signal 360 in FIG. 3C accordingly avoids switching from one to zero in the middle of the block of high confidence values 330 despite that the state signal 350 changes.

This is because the energy value of the current audio frame of the audio input signal is compared to the energy values of a pre-determined set of previous frames, such that the steering signal 360 is kept at its current value if the energy value of the audio is relatively unchanged for a pre-determined set of previous frames. The pre-determined set may e.g. be the most recent 24, 48 or 96 audio frames.

In one specific example, the steering signal 360 is kept at its current value if the energy value of the current audio frame is equal to or above the energy value of 90% of the most recent 48 audio frames. Other ratios such as 80%, 70%, etc., are possible, and also other counts of audio frames such as 10, 35, 42, etc.

Once the block of high confidence values 330 is completed, the example steering signal in FIG. 3C switches from one to zero. The switch is implemented by applying a ramp function. During the ramp, the steering signal 360 has a value between zero and one and thus leads to mixing the binauralized audio signal and the audio input signal into a mixed audio signal and setting the mixed audio signal as audio output signal. This further avoids abrupt changes to the binauralization that would lead to an inconsistent listening experience.

The ramping may be implemented in that upon the steering signal 360 being changed to activate binauralization of audio, the step of generating the audio output signal comprises: for a first threshold period of time, mixing the binauralized audio signal and the audio input signal into a mixed audio signal and setting the mixed audio signal as audio output signal, wherein a portion of the binauralized audio signal in the mixed audio signal is gradually increased during the first threshold period, and wherein at an end of the first threshold period, the audio output signal comprises only the binauralized audio signal.

Alternatively, upon the steering signal 360 being changed to activate binauralization of audio, the step of generating the audio output signal comprises setting the audio output signal as the binauralized audio signal, e.g. no ramping.

The ramping may further be implemented in that upon the steering signal 360 being changed to deactivate or reduce binauralization of audio, the step of generating the audio output signal comprises: for a second threshold period of time, mixing the binauralized audio signal and the audio input signal into a mixed audio signal and setting the mixed audio signal as audio output signal, wherein a portion of the binauralized audio signal in the mixed audio signal is gradually decreased during the second threshold period, and wherein at an end of the second threshold period, the audio output signal comprises only the audio input signal.

Alternatively, upon the steering signal 360 being changed to deactivate or reduce binauralization of audio, the step of generating the audio output signal comprises setting the audio output signal as the audio input signal.

The example steering signal 360 in FIG. 3C is implemented according to the following three rules:

If the state signal 350 switches from one to zero, the steering signal 360 will start increasing from zero to one according to: $w(t)=I[\tau\leq t<\tau+1/\beta_a]\beta_a(t-\tau)$, where w(t) is the steering signal 360 at frame t, I[•] is a characteristic function, which is equal to one if and only if the condition [•] is satisfied, τ is the time when the state signal 350 switches from one to zero and $\beta_a$ is an absolute value of the slope of the line when the steering signal 360 changes from zero to one. In an embodiment, $\beta_a=1/2$, which leads to a ramp-up time of 2 seconds.

If the state signal 350 switches from zero to one, the steering signal 360 will start decreasing from one to zero only if the following two conditions are satisfied: the confidence value 330 of the current frame c(t) is less than a deactivation threshold value $T_{switch}$; and the smoothed energy signal $\bar{p}(t)$ is smaller than a threshold portion R of the energy values of a pre-determined number M of earlier frames, wherein $\bar{p}(t)=\alpha_{enengy}p(t)+(1-\alpha_{energy})\bar{p}(t-1)$, where $\alpha_{enengy}$ is a smoothing coefficient. If these conditions are met, the steering signal 360 will, according to some embodiments, start decreasing from one to zero according to: $w(t)=I[\tau\le t<\tau+1/\beta_r](1-\beta_r(t-\tau))$, where $\tau$ is the time when the state signal 350 switches from zero to one and $\beta_r$ is an absolute value of the slope of the line when the steering signal 360 changes from one to zero. In an embodiment, $T_{switch}$ is 0.5, $\alpha_{enengy}$ is 0.99, R is 10%, M is a number of frames corresponding to one second and $\beta_r=1/3$, which leads to a ramp-down time of 3 seconds.

If the state signal 350 is unchanged, the steering signal 360 will hold its last value.

To achieve a smooth transition between the binauralization being active or not, a mixing procedure will be taken if $w(t)\in(0,1)$. That is, the audio output signal will be a mixed audio signal. Given the audio input signal x(t), the generated binauralized audio signal B(t), and the steering signal 360 w(t), the output audio signal y(t) may be represented as $y(t)=w(t)B(t)+(1-w(t))x(t)$.

As such, the binauralized audio signal and the audio input signal are mixed as a linear combination with weights that sum to unity, wherein the weights depend on a value of the steering signal 360. The weight of the binauralized audio signal is higher than the weight of the audio input signal if the steering signal 360 is closer to one than zero, and vice versa.

Figure 4:
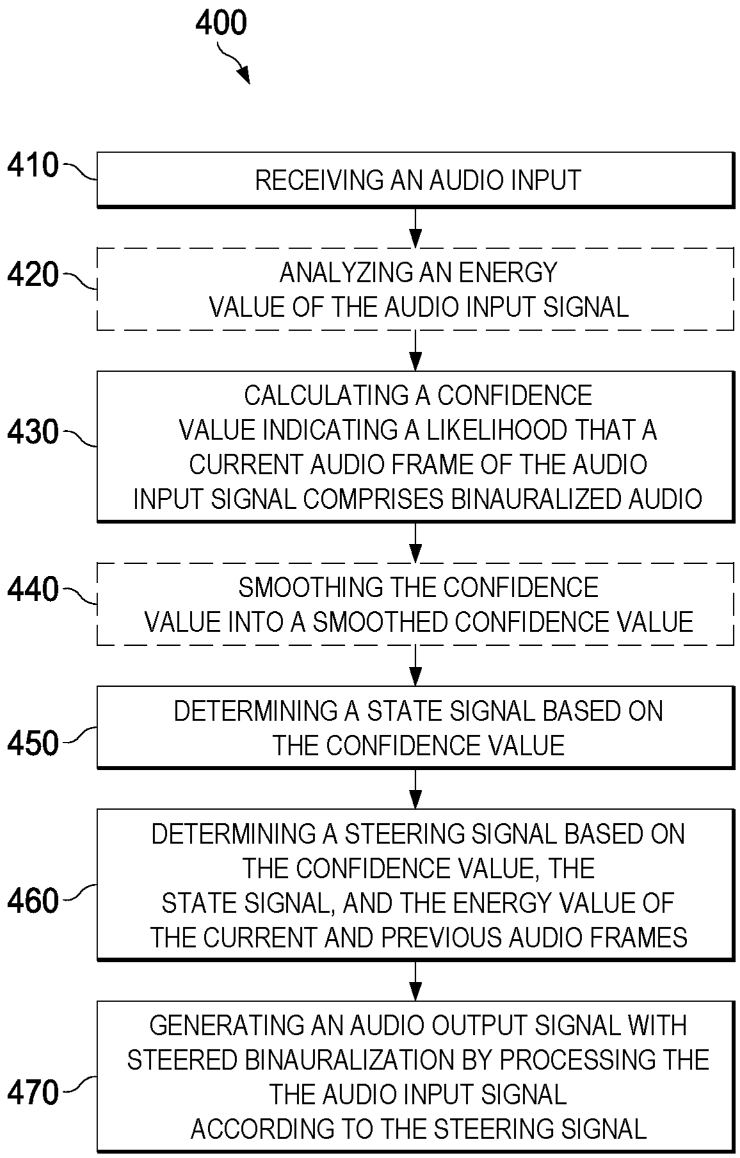
FIG. 4 is a flowchart illustrating an example process of binauralization steering.

FIG. 4 shows a flowchart illustrating a method 400 for steering binauralization of audio. The method 400 comprises a number of steps, some of which are optional, and some may be performed in any order. The method 400 shown in FIG. 4 is an example embodiment and not intended to be limiting.

The first step of the method 400 is a step of receiving 410 an audio input signal. The audio input signal may be any format and may be compressed and/or encrypted or not. Preferably, the step of receiving 410 an audio input signal comprises decrypting any encrypted audio and/or uncompressing any compressed audio before any other step of the method 400 is performed. The audio input signal may comprise several channels of audio, some of which may comprise only binauralized sound, some of which may comprise only un-binauralized sound and some of which may comprise a mix of binauralized and un-binauralized sound. The audio input signal does not need to comprise both binauralized and un-binauralized sound, though the steering result will be very simple in any other case.

Another step of the method 400 is a step of analyzing 420 an energy value of the audio input signal. This step 420 may comprise calculating the energy value x(t) of the current frame t by e.g. calculating the root mean square of the energy value and/or the smoothed energy signal $\bar{p}(t)$ or any other suitable energy information. This information is then output as the result of the step of analyzing 420 an energy value of the audio input signal.

The step of analyzing 420 an energy value of the audio input signal is optional and if included, this step 420 is performed before the step of determining 460 a steering signal. As an alternative to this step 420, energy information may be extracted from another source, such as from metadata.

Another step of the method 400 is a step of calculating 430 a confidence value indicating a likelihood that a current audio frame of the audio input signal comprises binauralized audio.

This step 430 may be performed independently of the other steps of the method 400.

This step 430 may further comprise the steps of: extracting features of the current audio frame of the audio input signal, the features of the audio input signal comprise at least one of inter-channel level differences, ICLDs, inter-channel phase differences, ICPDs, and inter-channel coherences, ICCs, and calculating the confidence value based on the extracted features; receiving features of a plurality of audio frames of the audio input signal previous to the current audio frame, the features corresponding to the extracted features of the current audio frame; applying weights to the features of the current and the plurality of previous audio frames of the audio input signal, wherein the weight applied to the features of the current audio frame is larger than the weights applied to the features of the plurality of previous audio frames, and calculating the confidence value based on the weighted features.

This step 430 may further comprise applying weights to the features of the current and the plurality of previous audio frames of the audio input signal according to an asymmetric window function, wherein the asymmetric window may be a first half of a Hamming window.

This step 430 may further comprise accumulating the features of the current and a pre-determined number of previous audio frames of the audio input signal into a weighted histogram that weights each sub-band used to calculate the features according to the total energy in that sub-band, and calculating the confidence value based on the mean value or standard variation of the weighted histogram.

This step 430 may further comprise inputting the weighted features of the current and the plurality of previous audio frames of the audio input signal, into a machine learning classifier, wherein the machine learning classifier is trained to output a confidence value based on the input.

Another step of the method 400 is a step of smoothing 440 the confidence value into a smoothed confidence value. This step 440 is optional and if included, this step 440 is performed as a part of the step of calculating 430 a confidence value, however the steps 430, 440 may be implemented by different circuits/units. As a result, this step 440 may be performed independently of the steps of the method 400 other than the step of calculating 430 a confidence value.

This step 440 may comprise receiving a confidence value of an audio frame immediately preceding the current audio frame; and adjusting the confidence value of the current audio frame using a one-pole filter wherein the confidence value of the current audio frame and the confidence value of an audio frame immediately preceding the current audio frame are inputs to the one-pole filter and the adjusted confidence value is an output from the one-pole filter.

This step 440 may further comprise the one-pole filter having a smoothing time lower than a smoothing threshold, wherein the smoothing threshold is determined based on an RC time constant.

Another step of the method 400 is a step of determining 450 a state signal based on the confidence value.

The state signal is a binary function with the range of zero to one. The value of the state signal being zero indicates that the audio input signal comprises an un-binauralized state while the value of the state signal being one indicates that the audio input signal comprises a binauralized state.

Another step of the method 400 is a step of determining 460 a steering signal based on: the energy value of the audio frame analyzed in the step of analyzing 420 an energy value of the audio input signal or received through other means; the confidence value calculated in the step of calculating 430 a confidence value and/or the step of smoothing 440 the confidence value, depending on whether the step of smoothing 440 the confidence value has occurred; and the state signal determined in the step of determining 450 a state signal.

The steering signal steers the step of generating 470 an audio output signal. If the steering signal is zero, the binauralization of audio is deactivated or reduced. If the steering signal is one, the binauralization of audio is activated. If the steering signal is between zero and one, a mix occurs.

The step of generating 470 an audio output signal may or may not be performed in conjunction with the step of determining 460 a steering signal and may or may not be performed by the same circuit.

Figure 5:
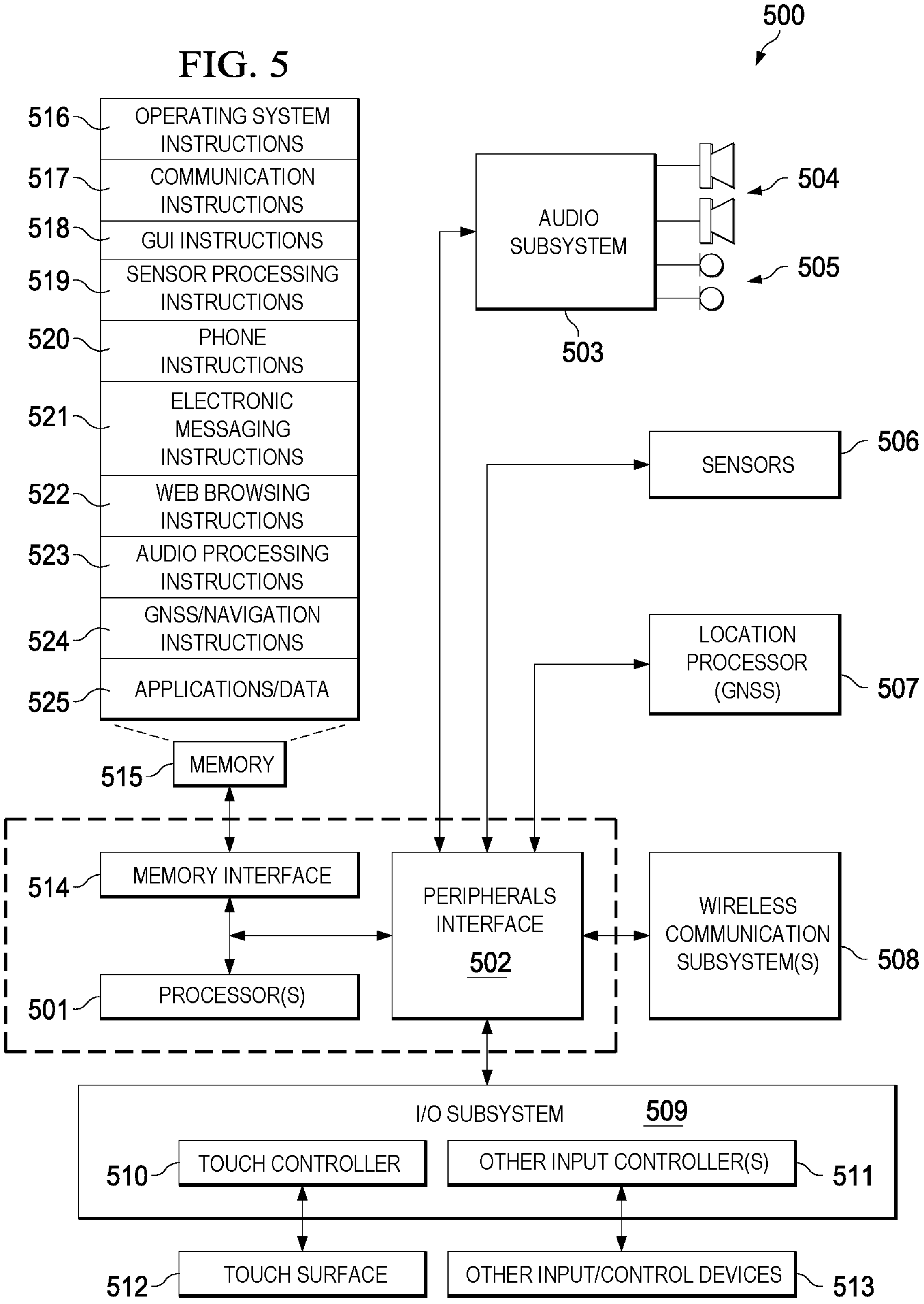
FIG. 5 is a mobile device architecture for implementing the features and processes described in reference to FIGS. 1-4, according to an embodiment.

FIG. 5 shows a mobile device architecture for implementing the features and processes described in reference to FIGS. 1-4, according to an embodiment. Architecture 500 may be implemented in any electronic device, including but not limited to: a desktop computer, consumer audio/visual, AV, equipment, radio broadcast equipment or mobile devices [e.g., smartphone, tablet computer, laptop computer or wearable device]. In the example embodiment shown, architecture 500 is for a smart phone and includes processor[s] 501, peripherals interface 502, audio subsystem 503, loudspeakers 504, microphone 505, sensors 506 [e.g., accelerometers, gyros, barometer, magnetometer, camera], location processor 507 [e.g., GNSS receiver], wireless communications subsystems 508 [e.g., Wi-Fi, Bluetooth, cellular] and I/O subsystem[s] 509, which includes touch controller 510 and other input controllers 511, touch surface 512 and other input/control devices 513. Other architectures with more or fewer components may also be used to implement the disclosed embodiments.

Memory interface 514 is coupled to processors 501, peripherals interface 502 and memory 515 [e.g., flash, RAM, ROM]. Memory 515 stores computer program instructions and data, including but not limited to: operating system instructions 516, communication instructions 517, GUI instructions 518, sensor processing instructions 519, phone instructions 520, electronic messaging instructions 521, web browsing instructions 522, audio processing instructions 523, GNSS/navigation instructions 524 and applications/data 525. Audio processing instructions 523 include instructions for performing the audio processing described in reference to FIGS. 1-4.

Aspects of the systems described herein may be implemented in an appropriate computer-based sound processing network environment for processing digital or digitized audio files. Portions of the adaptive audio system may include one or more networks that comprise any desired number of individual machines, including one or more routers [not shown] that serve to buffer and route the data transmitted among the computers. Such a network may be built on various different network protocols, and may be the Internet, a Wide Area Network, WAN, a Local Area Network, LAN, or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical [non-transitory], non-volatile storage media in various forms, such as optical, magnetic or semiconductor storage media.

Further embodiments of the present disclosure will become apparent to a person skilled in the art after studying the description above. Even though the present description and drawings disclose embodiments and examples, the disclosure is not restricted to these specific examples. Numerous modifications and variations can be made without departing from the scope of the present disclosure, which is defined by the accompanying claims. Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. The mere fact that certain measures are recited in mutually different dependent claims does not indicate that a combination of these measured cannot be used to an advantage.

The systems and methods disclosed hereinabove may be implemented as software, firmware, hardware or a combination thereof. For example, aspects of the present application may be embodied, at least in part, in an apparatus, a system that includes more than one device, a method, a computer program product, etc. In a hardware implementation, the division of tasks between functional units referred to in the above description does not necessarily correspond to the division into physical units; to the contrary, one physical component may have multiple functionalities, and one task may be carried out by several physical components in cooperation. Certain components or all components may be implemented as software executed by a digital signal processor or microprocessor or be implemented as hardware or as an application-specific integrated circuit. Such software may be distributed on computer readable media, which may comprise computer storage media [or non-transitory media] and communication media [or transitory media]. As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks, DVDs, or other optical disk storage, magnetic cassettes, magnetic tape, magnetic disk storage or other magnetic storage devices, or any other medium which can be used to store the desired information, and which can be accessed by a computer. Further, it is well known to the skilled person that communication media typically embodies computer readable instructions, data structures, program modules or other data in a modulated data signal such as a carrier wave or other transport mechanism and includes any information delivery media.

The invention claimed is:

1. A method for steering binauralization of audio, the method comprising steps of:

receiving an audio input signal, the audio input signal comprising a plurality of audio frames;

calculating a confidence value indicating a likelihood that a current audio frame of the audio input signal comprises binauralized audio;

determining a state signal based on the confidence value, the state signal indicating that the current audio frame being in an un-binauralized state or in a binauralized state;

determining a steering signal, wherein, upon the state signal being changed from indicating the un-binauralized state to indicating the binauralized state:

changing the steering signal to activate binauralization of audio by applying a head related transfer function, HRTF, on the audio input signal resulting in a binauralized audio signal, and generating an audio output signal, at least partly comprising the binauralized audio signal;

wherein, upon the state signal being changed from indicating the binauralized state to indicating the un-binauralized state, setting a deactivation mode of binauralization to true; and upon the deactivation mode of the binauralization being true, and the confidence value of the current audio frame being below a deactivation threshold, and an energy value of the current audio frame being lower than energy values of a threshold number of audio frames of the audio input signal previous to the current audio frame:

setting the deactivation mode of the binauralization to false, changing the steering signal to deactivate or reduce binauralization of audio, and generating the audio output signal at least partly comprising the audio input signal.

2. The method of claim 1, wherein upon the steering signal being changed to activate binauralization of audio, the step of generating the audio output signal comprises:

for a first threshold period of time, mixing the binauralized audio signal and the audio input signal into a mixed audio signal and setting the mixed audio signal as audio output signal, wherein a portion of the binauralized audio signal in the mixed audio signal is gradually increased during the first threshold period, and wherein at an end of the first threshold period, the audio output signal comprises only the binauralized audio signal.

3. The method of claim 1, wherein upon the steering signal being changed to deactivate or reduce binauralization of audio, the step of generating the audio output signal comprises:

for a second threshold period of time, mixing the binauralized audio signal and the audio input signal into a mixed audio signal and setting the mixed audio signal as audio output signal, wherein a portion of the binauralized audio signal in the mixed audio signal is gradually decreased during the second threshold period, and wherein at an end of the second threshold period, the audio output signal comprises only the audio input signal.

4. The method of claim 1, wherein upon the steering signal being changed to activate binauralization of audio, the step of generating the audio output signal comprises setting the audio output signal as the binauralized audio signal.

5. The method of claim 1, wherein upon the steering signal being changed to deactivate or reduce binauralization of audio, the step of generating the audio output signal comprises setting the audio output signal as the audio input signal.

6. The method claim 1, wherein the step of calculating a confidence value comprises extracting features of the current audio frame of the audio input signal and calculating the confidence value based on the extracted features, said features comprising at least one of:

inter-channel level differences, ICLDs, inter-channel phase differences, ICPDs, inter-channel coherences, ICCs, mid/side Mel-Frequency Cepstral Coefficients, MFCC, and a spectrogram peak/notch feature.

7. The method of claim 6, wherein the step of calculating a confidence value further comprises:

receiving features of a plurality of audio frames of the audio input signal previous to the current audio frame, the features corresponding to the extracted features of the current audio frame;

applying weights to the features of the current and the plurality of previous audio frames of the audio input signal, wherein the weight applied to the features of the current audio frame is larger than the weights applied to the features of the plurality of previous audio frames, and calculating the confidence value based on the weighted features.

8. The method of claim 7, wherein the step of calculating a confidence value further comprises:

applying weights to the features of the current and the plurality of previous audio frames of the audio input signal according to an asymmetric window function.

9. The method of claim 8, wherein the asymmetric window is a first half of a Hamming window.

10. The method according to claim 7, further comprising:

determining if the current audio frame and the plurality of previous audio frames includes an impulse-like signal, and if this is the case, applying dynamic weights to the features of the current audio frame and the plurality of previous audio frames, wherein the dynamic weights are based on ratios of frame energy.

11. The method according to claim 10, wherein the determining step involves:

calculating a frame energy ratio $R_i$ for each frame, according to:

$$R_i = \frac{E_i}{\sum_{i=1}^{N} E_i},$$

where $E_i$ is an average of energy of all channels in frame i, and determining that frame i is impulse-like if $R_i$ is greater than a first threshold and $E_i$ is greater than a second threshold.

12. The method of claim 7, wherein the step of calculating a confidence value further comprises:

accumulating the features of the current and a pre-determined number of previous audio frames of the audio input signal into a weighted histogram that weights each sub-band used to calculate the features according to the total energy in that sub-band, and calculating the confidence value based on the mean value or standard variation of the weighted histogram.

13. The method of claim 6, wherein the step of calculating a confidence value comprises:

inputting extracted features of the current audio frame of the audio input signal, and features of a plurality of audio frames of the audio input signal previous to the current audio frame if received, into a machine learning classifier, wherein the machine learning classifier is trained to output a confidence value based on the input.

14. The method of claim 1, wherein the step of calculating a confidence value comprises:

receiving a confidence value of an audio frame immediately preceding the current audio frame;

adjusting the confidence value of the current audio frame using a one-pole filter wherein the confidence value of the current audio frame and the confidence value of an audio frame immediately preceding the current audio frame are inputs to the one-pole filter and the adjusted confidence value is an output from the one-pole filter.

15. The method according to claim 1, wherein the step of determining the state signal comprises:

applying a four-state state machine wherein two states of the four-state state machine correspond to the state signal indicating that the current audio frame is in an un-binauralized state and the remaining two states of the four-state state machine correspond to the state signal indicating that the current audio frame is in a binauralized state.

16. The method of claim 15, wherein the one-pole filter has a smoothing time lower than a smoothing threshold, wherein the smoothing threshold is determined based on an RC time constant.

17. The method of claim 15, wherein the four-state state machine comprises an un-binauralized holding state, UBH, a binauralized holding state, BH, a binauralized release counting state, BRC, and a binauralized attack counting state, BAC wherein UBH and BAC correspond to the state signal indicating that the current audio frame is in an un-binauralized state and BH and BRC correspond to the state signal indicating that the current audio frame is in a binauralized state; and wherein the state transitions from UBH to BAC upon the confidence value being above a confidence threshold, the state transitions from BAC to BH upon a threshold number of frames having a confidence value above a confidence threshold while the state is BAC being reached, the state transitions from BH upon the confidence value being below a confidence threshold and the state transitions from BRC to UBH upon a pre-determined number of consecutive frames having a confidence value below a confidence threshold.

18. A non-transitory computer-readable medium storing instructions that, upon execution by one or more computer processors, cause the one or more processors to perform the method of claim 1.

19. A system for steering binauralization of audio, the system comprising:

an audio receiver for receiving an audio input signal, the audio input signal comprising a plurality of audio frames;

a binauralization detector for calculating a confidence value indicating a likelihood that a current audio frame of the audio input signal comprises binauralized audio;

a state decider for determining a state signal based on the confidence value, the state signal indicating that the current audio frame being in an un-binauralized state or in a binauralized state;

a switching decider for determining a steering signal, wherein, upon the state decider changing the state signal from indicating the un-binauralized state to indicating the binauralized state, the switching decider is configured to:

change the steering signal to activate binauralization of audio by applying a head related transfer function, HRTF, on the audio input signal resulting in a binauralized audio signal, and generate an audio output signal, at least partly comprising the binauralized audio signal;

wherein, upon the state decider changing the state signal from indicating the binauralized state to indicating the un-binauralized state, the switching decider sets a deactivation mode of binauralization to true; and upon the deactivation mode of the binauralization being true, and the confidence value of the current audio frame being below a deactivation threshold, and an energy value of the current audio frame being lower than energy values of a threshold number of audio frames of the audio input signal previous to the current audio frame, the switching decider is configured to:

set the deactivation mode of the binauralization to false, change the steering signal to deactivate or reduce binauralization of audio, and generate the audio output signal at least partly comprising the audio input signal.

* * * * *